United States Patent
McKinstrie (10) Patent No.: US 7,630,126 B2
(45) Date of Patent: Dec. 8, 2009

(54) TWO-PUMP OPTICAL PARAMETRIC DEVICES HAVING REDUCED STIMULATED RAMAN SCATTERING NOISE LEVELS

(75) Inventor: Colin J. McKinstrie, Manalapan, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 608 days.

(21) Appl. No.: 11/172,104

(22) Filed: Jun. 30, 2005

(65) Prior Publication Data

US 2008/0130097 A1    Jun. 5, 2008

(51) Int. Cl.
*G02F 1/35* (2006.01)
*G02F 2/02* (2006.01)

(52) U.S. Cl. ................................ 359/330; 330/4.5
(58) Field of Classification Search ......... 359/326–332; 330/4.5; 372/21, 22; 385/122
See application file for complete search history.

(56) References Cited

U.S. PATENT DOCUMENTS 6,330,104 B1 * 12/2001 Kim et al. .................. 359/332
6,529,314 B1 * 3/2003 Shukunami et al. ......... 359/332
7,145,715 B2 * 12/2006 Chraplyvy et al. .......... 359/330
2004/0042060 A1 * 3/2004 McKinstrie et al. ......... 359/330

* cited by examiner

*Primary Examiner*—Daniel Petkovsek (57) ABSTRACT

Two-pump optical parametric devices (OPDs), and methods of operating the same, generate desired output signals and idlers having reduced stimulated Raman scattering (SRS) noise levels. When the two-pump OPD is used as a two-pump optical parametric amplifier (OPA), the pumps are polarized perpendicular to each other, and the lower-frequency sideband (signal or idler) is polarized parallel to the lower-frequency pump (perpendicular to the higher-frequency pump). The desired output may be an amplified signal or a generated idler. When the two-pump OPD is used as a two-pump optical frequency converter (OFC), the pumps can be polarized parallel to one another, in which case the signal and idler are both perpendicular to the pumps, or perpendicular to one another, in which case the lower-frequency sideband (signal or idler) is polarized parallel to the lower-frequency pump (perpendicular to the higher-frequency pump).

10 Claims, 6 Drawing Sheets

TWO-PUMP OPTICAL PARAMETRIC DEVICES HAVING REDUCED STIMULATED RAMAN SCATTERING NOISE LEVELS

CROSS-REFERENCE TO RELATED APPLICATIONS

This application is related to a continuation-in-part (CIP) U.S. patent application Ser. No. 11/068,555, filed Feb. 28, 2005, the teachings of which are incorporated herein by reference.

FIELD OF THE INVENTION

The present invention relates to optical parametric devices (OPDs), such as optical parametric amplifiers (OPAs) and optical frequency converters (OFCs), and more particularly to two-pump OPDs having reduced stimulated Raman scattering (SRS) noise levels in their output signals or idlers.

BACKGROUND OF THE INVENTION

Optical communication systems employ optical amplifiers, e.g., to compensate for signal attenuation in optical fibers. One type of amplifier that may be used in a fiber-based communication system is an OPA. As known in the art, an OPA is a device that produces a tunable coherent optical output via a nonlinear optical processes called four-wave mixing (FWM), in which two photons from one pump wave, or two pump waves, are destroyed and two new photons are created, with conservation of the total photon energy and momentum. The waves corresponding to the two new photons are usually referred to as the signal wave and the idler wave. This process amplifies a weak input signal and generates an idler, which is a frequency converted (FC) and phase-conjugated (PC) image of the signal. As known in the art, there is another type of FWM process, in which one signal photon and one pump photon are destroyed, and one idler photon and one different pump photon are produced, with conservation of the total photon energy and momentum. This process transfers power from the signal to the idler, which is a FC image of the signal. Optical frequency converters, OFCs, can be used to perform switching and routing in communication systems. The fundamentals of FWM are discussed in a book by G. P. Agrawal ["Nonlinear Fiber Optics, 3rd Edition," Academic Press, 2001, hereafter referred to as GPA].

However, a problem with two-pump OPDs is the SRS noise that appears in the output signals and idlers. Because of SRS noise, the output signals or idlers produced by OPDs have lower signal-to-noise ratios (SNRs) than the input signals, which reduces the effectiveness of OPDs in communication systems.

SUMMARY OF THE INVENTION

In accordance with the present invention, two-pump OPDs, and methods of operating the same are described, which generate desired output signals and idlers having reduced SRS noise levels. In the case of a two-pump OPA, the pumps are polarized perpendicular to each other, and the lower-frequency sideband (signal or idler) is polarized parallel to the lower-frequency pump (perpendicular to the higher-frequency pump). The desired output may be an amplified signal or a generated idler (frequency-shifted copy of the signal). In the case of a two-pump OFC, the pumps can be polarized parallel to one another, in which case the signal and idler are both perpendicular to the pumps, or perpendicular to one another, in which case the lower-frequency sideband (signal or idler) is polarized parallel to the lower-frequency pump (perpendicular to the higher-frequency pump). The desired output may be an amplified signal or a generated idler.

More particularly, I describe a method of operating a two-pump optical parametric device, OPD, as an amplifier, OPA, that generates a desired output signal having a reduced stimulated Raman scattering, SRS, noise level. The method comprising the steps of
(1) applying first and second polarized pumps to the OPA, the frequency of the first pump, $P_1$, being lower than the frequency of the second pump, $P_2$, and the polarization of $P_1$ being perpendicular to the polarization of $P_2$;
(2) applying a polarized input signal S as an inner sideband adjacent to $P_1$ or $P_2$;
(3) outputting the desired output signal from an inner sideband adjacent to $P_1$ or $P_2$;
(4) wherein the inner sideband adjacent to $P_1$ is polarized parallel to $P_1$ and wherein
  (a) when the desired output is an amplified signal S, the input signal S is applied as an inner sideband adjacent to $P_1$ and the SRS noise level in the desired output signal is reduced by establishing the polarization of S to be perpendicular to the polarization $P_2$ and
  (b) when the desired signal is a generated PC idler, 2−, the input signal S is applied as an inner sideband adjacent to $P_2$ and the SRS noise level in idler 2− is reduced by establishing the polarization of S to be parallel to the polarization of $P_2$.

According to one embodiment, I describe a two-pump optical parametric amplifier, OPA, to generate a desired output signal having a reduced stimulated Raman scattering, SRS, noise level. The OPA comprises
  a first polarized coupler for coupling a first pump, $P_1$, to the two-pump OPA;
  a second polarized coupler for coupling a second pump, $P_2$, to the two-pump OPA, wherein the frequency of $P_1$ is lower than the frequency of $P_2$ and the polarization of the first polarized coupler is perpendicular to the polarization of the second polarized coupler;
  a third polarized coupler for coupling an input signal S in an inner sideband adjacent $P_1$ or $P_2$;
  means for outputting the desired output signal (or idler) from an inner sideband adjacent to $P_1$ or $P_2$, and
  wherein the inner sideband adjacent to $P_1$ is polarized parallel to $P_1$ and wherein
  (a) when the desired output is an amplified signal S, the input signal S is applied as an inner sideband adjacent to $P_1$ and the SRS noise level in the desired output signal is reduced by establishing the polarization of S to be perpendicular to the polarization $P_2$ and
  (b) when the desired signal is a generated PC idler, 2−, the input signal S is applied as an inner sideband adjacent to $P_2$ and the SRS noise level in the idler 2− is reduced by establishing the polarization of S to be parallel to the polarization of $P_2$.

According to another aspect of the invention, I describe a method of operating a two-pump optical parametric device, OPD, as an optical frequency converter, OFC, to convert an input signal at a first frequency to a desired output idler I at a second frequency having a reduced stimulated Raman scattering, SRS, noise level. The method comprising the steps of:
(1) applying a first polarized pump, $P_1$, and a second polarized pump, $P_2$, to the OFC, the frequency of $P_1$ being lower than the frequency of $P_2$;

(2) applying a polarized input signal S as an inner sideband 1+ adjacent to $P_1$ or an outer sideband 2+ adjacent to $P_2$; and (3) outputting the desired output idler I from an outer sideband 2+ adjacent to $P_2$ or an inner sideband 1+ adjacent to $P_1$.

In another embodiment, I describe a two-pump optical frequency converter, OFC, for converting an input signal at a first frequency to a desired output idler at a second frequency having a reduced stimulated Raman scattering, SRS, noise level. The OFC comprises a first polarized coupler for coupling a first pump, $P_1$, to the two-pump OFC;

a second polarized coupler for coupling a second pump, $P_2$, to the two-pump OFC, wherein the frequency of $P_1$ is lower than the frequency of $P_2$;

a third polarized coupler for coupling an input signal S in an inner sideband 1+ adjacent to $P_1$ or an outer sideband 2+ adjacent to $P_2$; and means for outputting the desired output idler, I, from an outer sideband 2+ adjacent to $P_2$ or an inner sideband 1+ adjacent to $P_1$.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
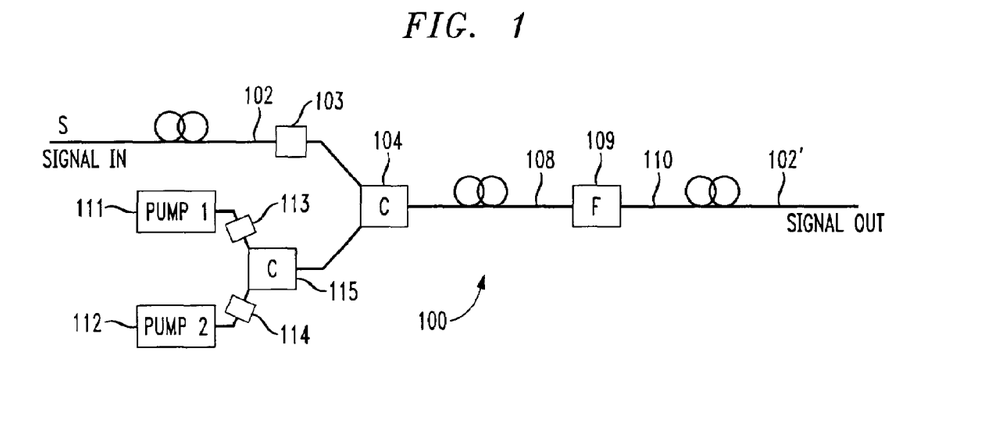
FIG. 1 shows a two-pump OPD in accordance with one embodiment of the present invention.

FIG. 1 shows, in accordance with one embodiment of the present invention, a two-pump OPD 100 that is configured for use in a long-haul transmission line of an optical communication system. OPA 100 is coupled between two sections 102 and 102' of long-haul optical fiber. The input optical signal S from section 102 is received or coupled via polarization coupler 103 to a coupler 104 of the OPA 100. The coupler 104 is configured to combine an input signal S from section 102 with two different pump waves generated by two pump-wave sources (e.g., lasers) 111 and 112. The output of pump sources 111 and 112 are received or coupled via polarization couplers 113 and 114, respectively, and are combined in coupler 115. The combined two-pump signal $P_1+P_2$ from coupler 115 is then further combined with input signal S in coupler 104. Depending on the implementation of OPD 100, each of the pump wave sources 111 and 112 may be a continuous-wave (CW) or pulsed optical field. The combined optical output from coupler 104 is coupled into a highly nonlinear fiber (HNF) 108, in which the signal is amplified by FWM. Frequency shifted copies of the signal are also produced. While the present invention describes the use of HNF 108 for OPA and OFC, it should be understood that other $\chi^{(3)}$ media that exhibit FWM, such as Kerr media, could be used. Additionally, a three-way coupler may be used to replace couplers 104 and 115 to combine the input signal S with the two pumps $P_1$ and $P_2$. A filter 109 is placed at the end of HNF 108 to pass the desired output optical sideband 110 (amplified signal or generated idler) and block the undesired sidebands. For example, if the desired output sideband 110 is an amplified version of input signal S from fiber 102, then filter 109 passes that amplified signal S and filters out the pump signals $P_1$ and $P_2$, and the one or more idlers generated in the HNF 108. Conversely, if the desired output sideband 110 is one of the idlers, then filter 109 filters out the pump signals $P_1$ and $P_2$, the amplified signal S from fiber 102, and the undesired idlers generated in the HNF 108. The desired output signal 110 is then transmitted over section 102'. One attractive feature of a two-pump OPD 100 is that the desired output sideband 110 can be selected to be an amplified or non-amplified, and conjugated or non-conjugated, version of input signal S at an arbitrary frequency (wavelength). In accordance with the present invention, as will be discussed in more detail in later paragraphs, the polarization of each of the couplers 103, 113, and 114, is selected to control the polarization of the input signal S, pump 111, and pump 112, respectively, so as to minimize SRS noise in the desired output signal 110 of OPD 100.

Figure 2:
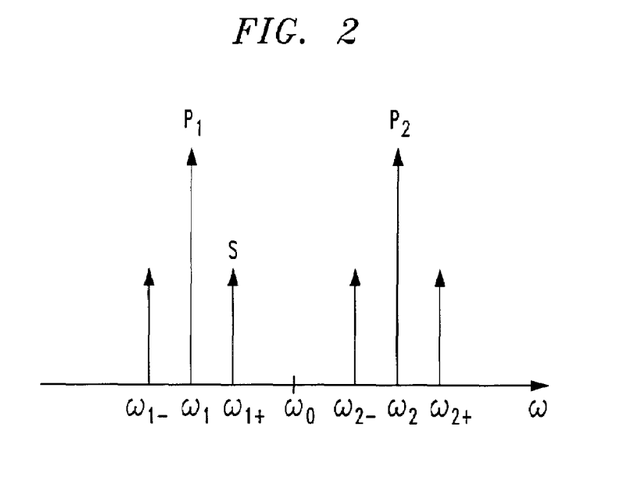
FIG. 2 illustrates a representative frequency structure in the OPD of FIG. 1.

FIG. 2 shows a simplified diagram of the output frequency structure developed in HNLF 108 of OPD 100. In addition to two pumps labeled $P_1$ and $P_2$ and located at frequencies $\omega_1$ and $\omega_2$, respectively, and a signal S (illustratively a sideband at frequency $\omega_{1+}$), various FWM processes in HNLF 408 produce three complementary sidebands at frequencies $\omega_{1-}$, $\omega_{2-}$, and $\omega_{2+}$. In general, the frequency of the signal S may be at any one of the four sidebands, with the remaining three sidebands being generated by FWM processes in OPD 100.

The following paragraphs describe the FWM processes in OPD 100 leading to the frequency structure of FIG. 2. Suppose that the optical signal S is at frequency $\omega_{1+}$ and the remaining three sidebands $\omega_{1-}$, $\omega_{2-}$, and $\omega_{2+}$ are idler sidebands. Then a modulation interaction (MI) produces the first idler sideband at frequency $\omega_{1+}$, according to the frequency-matching condition $$2\omega_1 = \omega_{1-} + \omega_{1+}, \tag{1}$$

a phase-conjugated (PC) process produces a second idler sideband at frequency $\omega_{2-}$ according to the frequency-matching condition $$\omega_1 + \omega_2 = \omega_{1+} + \omega_{2-}, \tag{2}$$

and a Bragg scattering (BS), or frequency converter (FC), process produces a third idler sideband at frequency $\omega_{2+}$ according to the frequency-matching condition $$\omega_{1+} + \omega_2 = \omega_1 + \omega_{2+}. \tag{3}$$

In addition, each of the three idler sidebands is coupled to the other two idler sidebands by an appropriate FWM process, i.e., MI, BS, or PC, which obeys an equation analogous to Eq. (1), (2) or (3).

In addition to the sidebands illustrated in FIG. 2, OPD 100 may also generate several additional sidebands (not shown). For example, MI with $P_2$ generates additional sidebands with frequencies $2\omega_2 - \omega_{1-}$ and $2\omega_2 - \omega_{1+}$ and MI with P1 generates additional sidebands with frequencies $2\omega_1 - \omega_{2-}$ and $2\omega_1 - \omega_{2+}$. However, unlike the four original sidebands shown in FIG. 2, each of which is coupled to all of the other three, none of the additional sidebands is coupled to all of the original four or all of the other three additional sidebands. Furthermore, for most values of $\omega_{1+}$, the additional sidebands are driven non-resonantly. Consequently, the effects of the additional sidebands on the operation of OPD 100 are not considered further.

Since OPD 100 relies on FWM enabled by the Kerr effect to amplify and generate sidebands, the first and second pumps ($P_1$ and $P_2$) are not required to be applied to HNF 108 in a prescribed order; $\omega_1$ and $\omega_2$ are not required to be derived based on or have a specific relationship with the specific energy-level transitions of the material of the HNF 108; and neither pump power is required to exceed the level that produces electromagnetically induced transparency (EIT) in HNF 108.

Figure 3A:
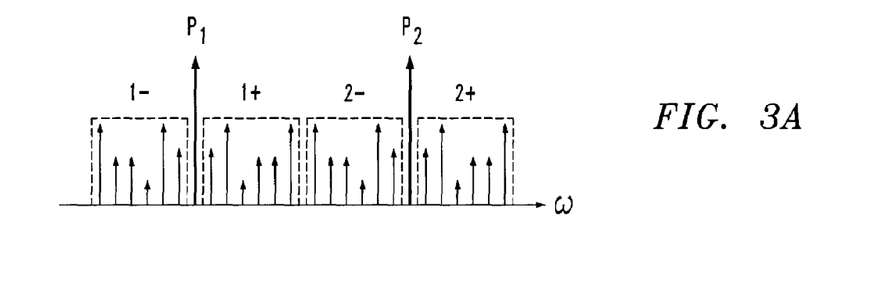
FIG. 3 shows the spectral (frequency) characteristics of an input signal (S) that is simultaneously amplified and replicated within four output spectral bands. If the signal is in band 1+, the 1-, 2- and 2+ bands are referred to as idler (I) bands.
Figure 3B:
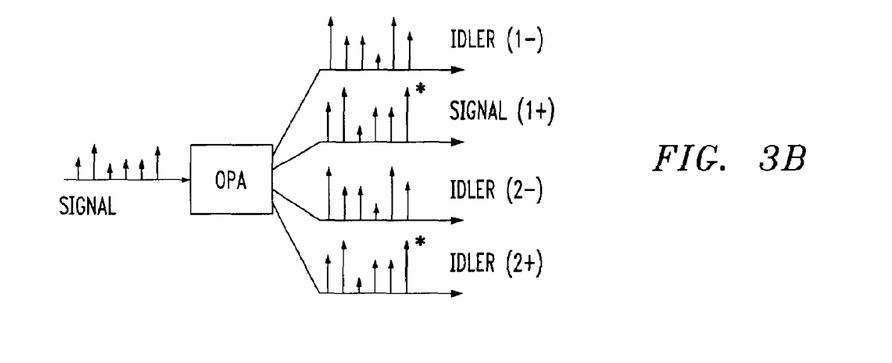

With reference to FIG. 3, there are shown illustrative frequency characteristics of a modulated input signal S, in band 1+, that is simultaneously amplified and replicated within four spectral bands 1−, 1+, 2− and 2+. The generated idlers are either spectrally-mirrored images of the modulated input signal S (idler bands 1− and 2−) or a translated (frequency-shifted) replica (idler band 2+). The spectrally-mirrored idlers are PCs, which offer the potential for mitigating impairments. The four signal bands produced by two-pump OPD 100 allow for considerable flexibility in selecting the properties of the desired output signal or idler. An inner band placement of input signal S (i.e., in bands 1+ and 2− located between the pumps $P_1$ and $P_2$) generates both an outer band nonPC (replica) and PCs located in the inner and outer bands. Thus, as shown in FIG. 3, an input signal S in band 1+ produces a nonPC in band 2+ and PCs in both inner band 2− and outer band 1−. An outer band placement of input signal S (i.e., in bands 1− and 2+) generates both an inner band nonPC (replica) and PCs located in the inner and outer bands. The existence of multiple bands depends on the presence of both pumps $P_1$ and $P_2$. The frequency of pumps $P_1$ and $P_2$ can be tuned in ways such that the signals and idlers in all four bands are strongly coupled, the signal and idler in bands 1+ and 2− are strongly coupled (OPA enabled by PC), or the signal and idler in bands 1+ and 2+ are strongly coupled (OFC enabled by BS).

Consider OPA enabled by phase-conjugated (PC) process. In this process $\gamma_1 + \gamma_2 \rightarrow \gamma_{1+} + \gamma_{2-}$: Two pump photons ($\gamma$) are destroyed (one from each pump), and one signal and one idler photon are created. OPA is characterized by the input-output relations $$A_{1+}(z) = \mu(z)A_{1+}(0) + \nu(z)A_{2-}(0)^*, \tag{4}$$

$$A_{2-}(z)^* = \nu(z)^*A_{1+}(0) + \mu(z)^*A_{2-}(0)^*, \tag{5}$$

where $A_{1+}$ and $A_{2-}$ are the amplitudes of the 1+ and 2− sidebands, respectively, and the transfer functions satisfy the auxiliary equation $|\mu|^2 - |\nu|^2 = 1$ [C. J. McKinstrie, S. Radic and M. G. Raymer, "Quantum noise properties of parametric amplifiers driven by two pump waves," Opt. Express 12, 5037-5066 (2004), hereafter referred to as MRR]. One can model the effects of SRS noise (approximately) by adding random (and independent) amplitude fluctuations $\delta a$ to each of the input amplitudes. Because $\omega_{1+}$ and $\omega_{2-}$ are both less than $\omega_2$, $\delta a_{1+}$ and $\delta a_{2-}$ are both nonzero (unless 1+ or 2− is perpendicular to $P_2$). If the input consists solely of noise, the outputs $$R_{1+}(z) = |A_{1+}(z)|^2 = |\mu(z)|^2 |\delta a_{1+}|^2 + |\nu(z)|^2 |\delta a_{2-}|^2 = |\mu(z)|^2 n_{1+} + |\nu(z)|^2 n_{2-}, \tag{6}$$

$$R_{2-}(z) = |A_{2-}(z)|^2 = |\nu(z)|^2 |\delta a_{1+}|^2 + |\mu(z)|^2 |\delta a_{2-}|^2 = |\nu(z)|^2 n_{1+} + |\mu(z)|^2 n_{2-}, \tag{7}$$

where $n_{1+}$ and $n_{2-}$ are the input noise powers, and $R_{1+}$ and $R_{2-}$ are the output noise powers, respectively. The SRS noise photons at $\omega_+$ are amplified by FWM, which also couples the noise photons at $\omega_{2-}$ to the output at $\omega_{1+}$. A similar statement can be made about the output at $\omega_{2-}$. These equations imply that $R_{1+} - R_{2-} = n_{1+} - n_{2-} > 0$ (unless 1+ is perpendicular to $P_2$). The gain $G = |\mu|^2$. The auxiliary equation implies that $|\nu|^2 = G - 1$. In the high-gain regime ($G \gg 1$), $|\nu|^2 \approx |\mu|^2$, and $R_{1+} \approx R_{2-} \approx G(n_{1+} + n_{2-})$. Thus, as a general rule, one can minimize the noise in both outputs by setting 1+ perpendicular to $P_2$, in which case $n_{1+} = 0$ [R. H. Stolen, "Polarization effects in fiber Raman and Brillouin lasers," IEEE J. Quantum. Electron. 15, 1157-1160 (1979), hereafter referred to as RHS].

Figure 4:
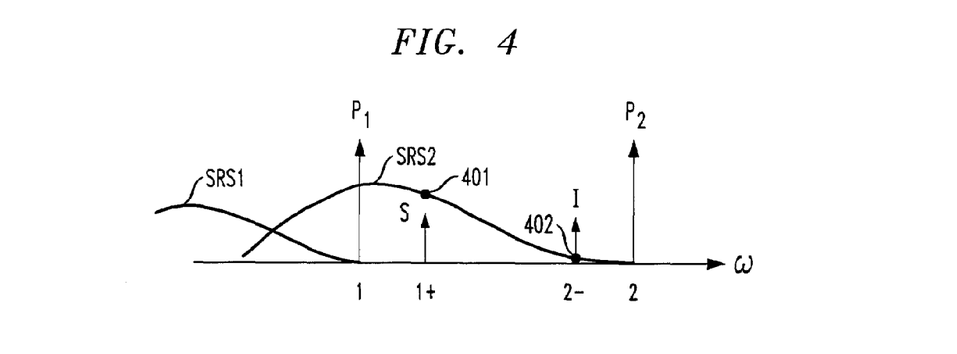
FIG. 4 shows an illustration of the SRS noise signals (SRS1 and SRS2) for a two pump OPA, where the two pumps P1 and P2, the input signal S in band 1+, and idler I in band 2- are all parallel polarized.

With reference to FIG. 4, there is shown an illustration of the resulting SRS noise fields SRS1 and SRS2 for a two-pump OPA 100, where the two pumps $P_1$ and $P_2$, input signal S (sideband 1+) and idler II (sideband 2−) are all parallel polarized. As shown, the SRS1 noise field lies in the same plane as the pump $P_1$ and the SRS2 noise field lies in the same plane as the pump $P_2$. Since pumps $P_1$ and $P_2$ are parallel (i.e., both are shown vertically polarized) SRS1 and SRS2 are in the same plane. Note that the amplitudes of the SRS1 and SRS2 noise fields increase to a well-defined peak values with increasing frequency separation from pumps $P_1$ and $P_2$, respectively. (For example, if the wavelength of pump $P_2$ is 1440 nm, then SRS2 peaks at about 110 nm from the pump wavelength, at about 1550 nm.) Notice that in the example of FIG. 4, since the frequencies of the input signal S and idler I lie between the frequencies of pumps $P_1$ and $P_2$, the SRS1 noise field has no direct effect on these signals. Thus, since it is only the SRS2 noise field that affects directly the desired output signal or idler 110 of OPA 100, the effects of the SRS1 noise field will not be considered further. It follows from Eqs. (6) and (7) that $R_{1+} = Gn_{1+} + (G-1)n_{2-}$ and $R_{2-} = (G-1)n_{1+} + Gn_{2-}$. Because noise photons at both input frequencies are coupled to both outputs, the output noise powers of the sidebands are comparable. However, R2− is slightly lower than R1+, as stated above. In this configuration, the idler is the desired output.

Figure 5:
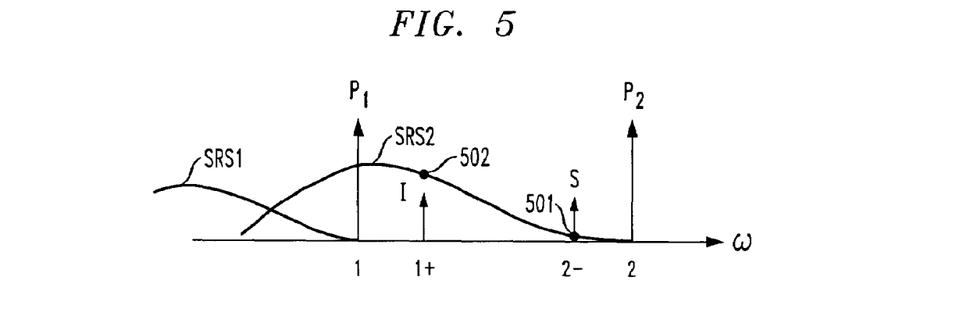
FIG. 5 shows the input signal S in band 2- and the idler I in band 1+, reversed from the positions shown in FIG. 4.

With reference to FIG. 5, there is shown the input signal S (in band 2−) and idler I (in band 1+) reversed from the positions shown in FIG. 4. Once again, it follows from Eqs. (6) and (7) that $R_{1+}=Gn_{1+}+(G-1)n_2$ and $R_{2-}=(G-1)n_{1+}+Gn_{2-}$. Because noise photons at both input frequencies are coupled to both outputs, the output noise powers of the sidebands are comparable. However, R2− is slightly lower than R1+, as stated above. In this configuration, the signal is the desired output.

In accordance with the present invention, I have recognized that the SRS growth rate $g_R$, and the amplified noise field that results, is polarization dependent. As stated in [RHS], the SRS growth rate of a signal that is perpendicular to the pump is an order-of-magnitude lower that the growth rate of a signal that is parallel to the pump. Since the output amplitude $A(z) = A(0)\exp(g_R z)$, an order-of-magnitude difference in the gain exponent $g_R z$ causes a many-orders-of magnitude difference in the gain $\exp(g_R z)$ and, hence, in the output amplitude $A(z)$: For practical purposes, the SRS noise field that is perpendicular to pump 2 can be neglected. Hence, in FIGS. 6-9 the noise field SRS2 is drawn parallel to pump 2.

Figure 6:
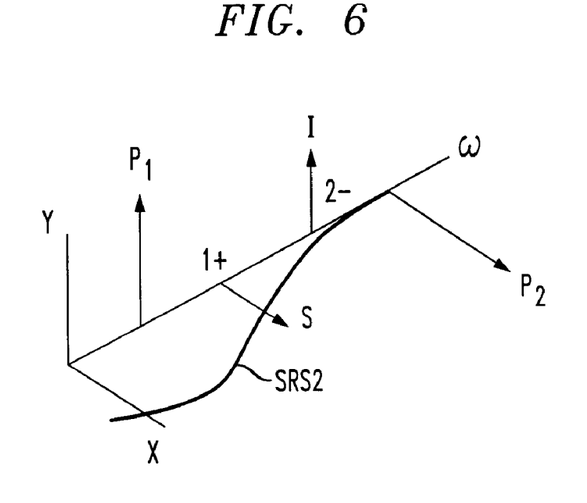
FIG. 6 shows the SRS2 noise when the polarization of the input signal S in band 1+ is parallel to pump P2.
Figure 7:
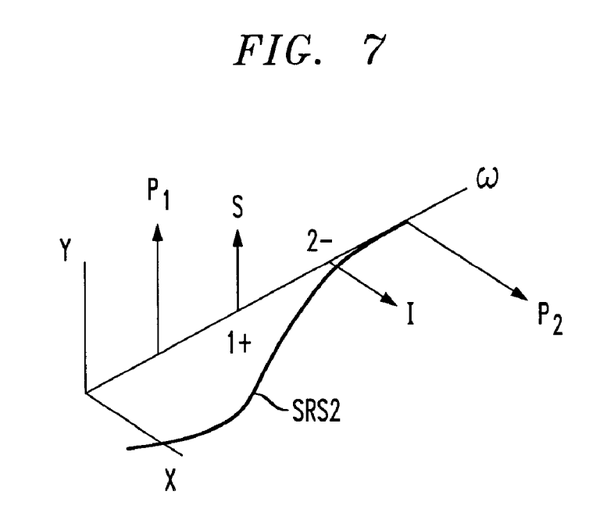
FIG. 7 shows the SRS2 noise when the polarization of the input signal S in band 1+ is perpendicular to pump P2.
Figure 8:
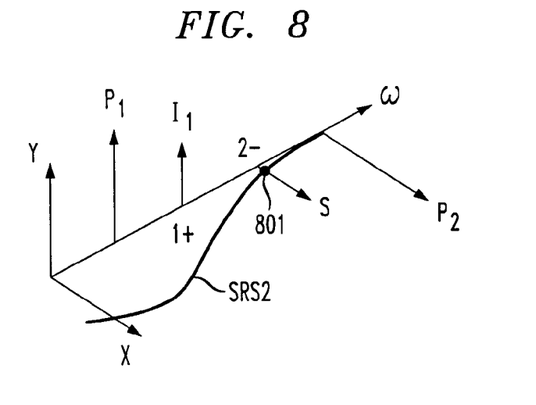
FIG. 8 shows the SRS2 noise when the polarization of the input signal S in band 2- is parallel to pump P2.
Figure 9:
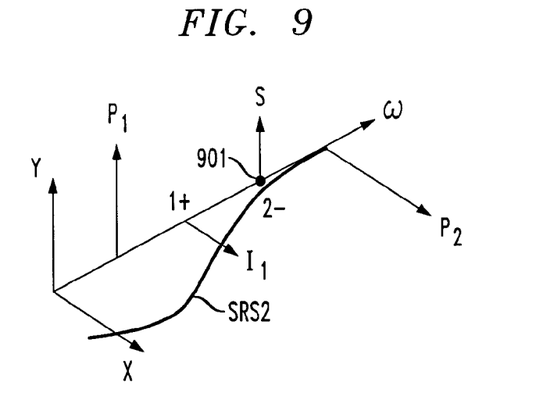
FIG. 9 shows the SRS2 noise when the polarization of the input signal S in band 2- is perpendicular to pump P2.

In FIGS. 6-9 and the discussion that follows, two signals are said to be parallel if both signals are vertical or both signals are horizontal. Similarly, two signals are said to be perpendicular (orthogonal) if one signal is vertical and the other is horizontal, or vice-versa. The concept of orthogonality is not limited to the linearly-polarized states illustrated in the figures. For example, right-circularly-polarized and left-circularly-polarized states are also orthogonal, even though neither state is linearly polarized [C. J. McKinstrie, H. Kogelnik, R. M. Jopson, S. Radic and A. V. Kanaev, "Four-wave mixing in fibers with random birefringence," Opt. Express 12, 2033-2055 (2004), hereafter referred to as MKJRK]. Although these figures were drawn for linearly-polarized states (horizontal and vertical), they also represent more-general polarization states that are parallel or orthogonal. FIG. 6 shows the input signal S in band 1+ polarized in direction X and the idler I in band 2− polarized in direction Y. FIG. 7 shows the input signal S in band 1+ polarized in direction Y and the idler I in band 2− polarized in direction X. FIG. 8 shows the input signal S in band 2− polarized in direction X and the idler I in band 1+ polarized in direction Y. FIG. 9 shows the input signal S in band 2− polarized in direction Y and the idler I in band 1+ polarized in direction X. In FIGS. 6-9 the polarization of the generated idler I is perpendicular to the polarization of the input signal S [see reference MKJRK], regardless of whether the idler frequency is higher or lower than the signal frequency. In addition, the pumps P1 and P2 are perpendicular. (If pumps P1 and P2 were parallel, a perpendicular input signal S would not generate an idler [MKJRK]. This configuration is not useful.) The parametric gain produced by FWM is polarization-independent [MKJRK]: It is the same regardless of whether the input signal S is parallel or perpendicular to pump $P_1$ (or $P_2$). For the configuration shown in FIG. 6, $R_{1+}=Gn_{1+}$ and $R_{2-}=(G-1)n_{1+}$. The output idler (2−) has slightly less noise than the output signal (1+), but both are noisy. For the configuration shown in FIG. 7, $R_{1+}=(G-1)n_{2-}$ and $R_{2-}=Gn_{2-}$. The output signal (1+) has slightly less noise than the output idler (2−), but neither is noisy. If the desired output is the 1+ signal, the second configuration is better (because $G-1<G$ and $n_{2-}<<n_{1+}$). If the desired output is the 2− idler, the second configuration is better (because $G-1\approx G$ and $n_{2-}<<n_{1+}$).

For the configuration shown in FIG. 8, $R_{1+}=(G-1)n_{2-}$ and $R_{2-}=Gn_{2-}$. The output idler (1+) has slightly less noise than the output signal (2−), but neither is noisy. For the configuration shown in FIG. 9, $R_{1+}=Gn_{1+}$ and $R_{2-}=(G-1)n_{1+}$. The output signal (2−) has slightly less noise than the output idler (1+), but both are noisy. If the desired output is the 2− signal, the first configuration is better (because $G-1\approx G$ and $n_{2-}<<n_{1+}$). If the desired output is the 1+ idler, the first configuration is better (because $G-1<G$ and $n_{2-}<<n_{1+}$).

Figure 10:
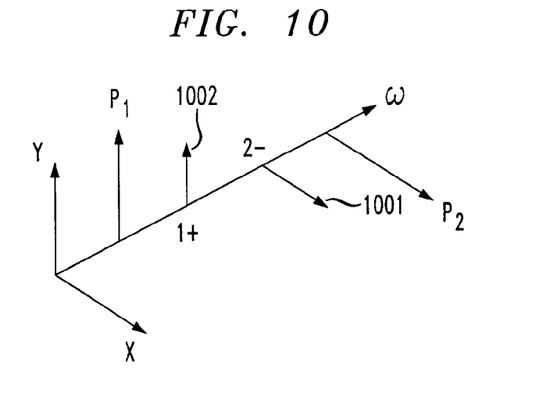
FIG. 10 shows the general frequency characteristics of the invented OPA, in which the desired output signal is in band 1+ (or 2-) and an idler is in band 2- (1+)

It follows from the analyses of FIGS. 6-9 that, if OPA 100 is to be operated as a low-noise device, the higher-frequency sideband should be parallel to pump 2 (so the noise source is n2−). In this case the lower-frequency sideband has slightly less noise, but neither sideband is noisy. This optimal configuration is illustrated in FIG. 10.

Now consider OFC enabled by BS. In this process $\gamma_{1+}+\gamma_2 \rightarrow \gamma_1 + \gamma_{2+}$: One pump and one signal photon are destroyed and one pump and one idler photon are created. OFC is characterized by the input-output relations $$A_{1+}(z)=\mu(z)A_{1+}(0)+\nu(z)A_{2+}(0), \tag{8}$$

$$A_{2+}(z)=-\nu^*(z)A_{1+}(0)+\mu(z)^*A_{2+}(0), \tag{9}$$

where the transfer functions satisfy the auxiliary equation $|\mu|^2+|\nu|^2=1$ [MRR]. As before, consider the effects of SRS noise, which are modeled (approximately) as random amplitude fluctuations $\delta a$ added to the input amplitudes. Because $\omega_{2+}>\omega_2$, $\delta a_{2+}=0$. It follows from this fact that, if the input consists solely of noise, $$R_{1+}(z)=|A_{1+}(z)|^2=|\mu(z)|^2|\delta a_{1+}|^2=|\mu(z)|^2 n_{1+}, \tag{10}$$

$$R_{2+}(z)=|A_{2+}(z)|^2=|\nu(z)|^2|\delta a_{1+}|^2=|\nu(z)|^2 n_{1+}, \tag{11}$$

where $R_{2+}$ is the output SRS noise power at frequency $\omega_{2+}$.

Figure 11A:
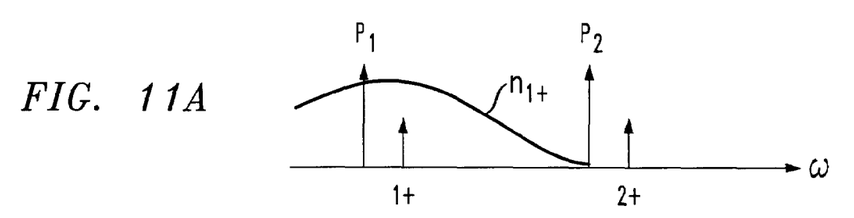
FIGS. 11A through 11C show the decrease in $n_{1+}$ as the idler 1+ increases in frequency from the frequency of pump P1 to the frequency of pump P2.
Figure 11B:
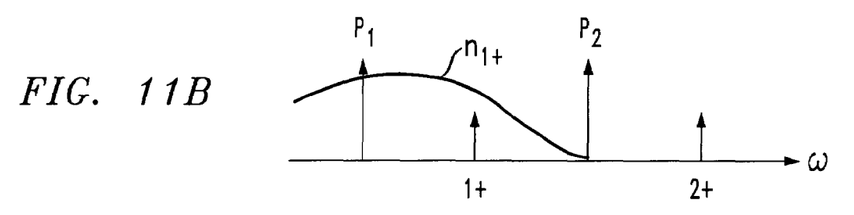
Figure 11C:
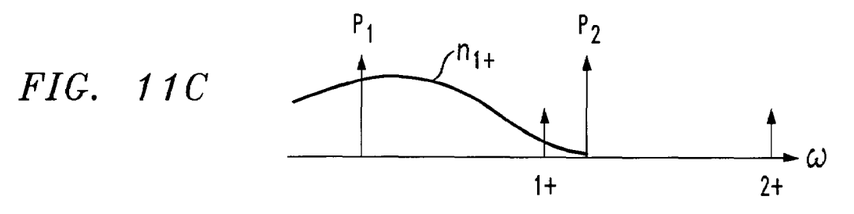
Figure 12:
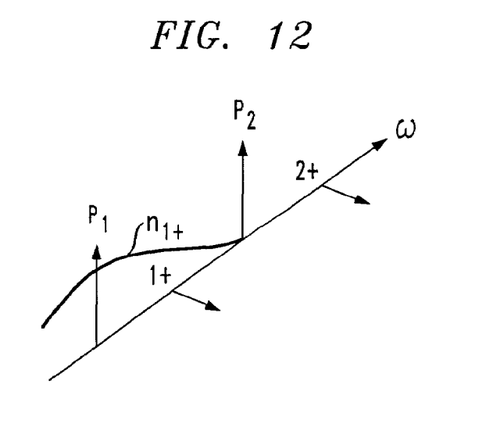
FIG. 12 shows that when the pumps P1 and P2 are parallel and idler 1+ is perpendicular to P1, then $n_{1+}$ is zero and idler 2+ is perpendicular to P1.
Figure 13:
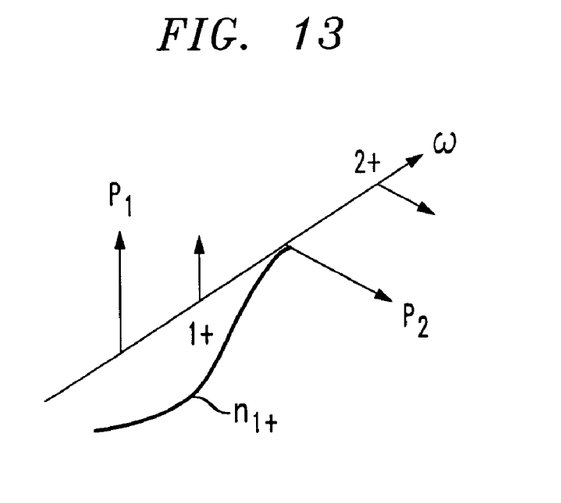
FIG. 13 shows that when the pump P1 is perpendicular to pump P2 and idler 1+ is parallel to P1, then $n_{1+}$ and $R_{2+}$ are zero and idler 2+ is perpendicular to P1.
Figure 14:
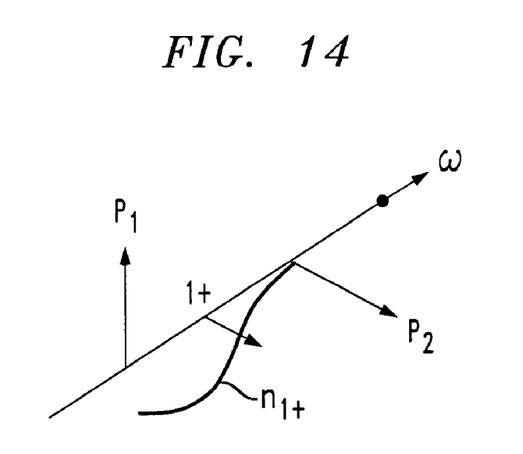
FIG. 14 shows that when the pump P1 is perpendicular to pump P2 and idler 1+ is perpendicular to P1, then no idler 2+ is generated.

First, suppose that 1+ is the signal and 2+ is the idler. Then the output noise $R_{2+}=|\nu|^2 n_{1+}$. Because the 2+ idler is desired $(A_{2+}=-\nu^* A_{1+})$, in a typical experiment $|\nu|^2 \approx 1$ and, hence, $|\mu|^2 \approx 0$. If the pumps are parallel and 1+ is parallel to $P_1$, then $R_{2+}$ is always nonzero. As $\omega_{1+}$ increases from $\omega_1$ to $\omega_2$, $n_{1+}$ decreases, as illustrated in FIG. 11. If the pumps are parallel and 1+ is perpendicular to $P_1$, as illustrated in FIG. 12, then $n_{1+}=0$, 2+ is generated perpendicular to $P_1$ [see MKJRK] and $R_{2+}=0$: SRS noise is eliminated completely. If $P_1$ and $P_2$ are perpendicular and 1+ is parallel to $P_1$ (perpendicular to $P_2$), as illustrated in FIG. 13, then $n_{1+}=0$, 2+ is generated perpendicular to $P_1$ (parallel to $P_2$) [MKJRK] and $R_{2+}=0$: SRS noise is eliminated completely. If $P_1$ and $P_2$ are perpendicular and 1+ is perpendicular to $P_1$ (parallel to $P_2$), as illustrated in FIG. 14, no 2+ idler is generated [MKJRK].

Second, suppose that 2+ is the signal and 1+ is the idler. Then the output noise $R_{1+}=|\mu|^2 n_{1+}$. Because the 1+ idler is desired $(A_{1+}=\nu A_{2+})$, in a typical experiment $|\nu|^2 \approx 1$ and, hence, $|\mu|^2 \approx 0$: Most SRS noise photons at $\omega_{1+}$ are frequency shifted to $\omega_{2+}$. Few remain at $\omega_{1+}$ to pollute the idler. SRS noise is eliminated completely if the pumps are parallel and 2+ is perpendicular to $P_2$, in which case 1+ is generated perpendicular to $P_2$ [MKJRK], or if the pumps are perpendicular and 2+ is parallel to $P_2$ (perpendicular to $P_1$), in which case 1+ is parallel to $P_1$ (perpendicular to $P_2$) [MKJRK]. If the pumps are perpendicular and 2+ is perpendicular to $P_2$ (parallel to $P_1$), no 1+ idler is generated [MKJRK].

It follows from the analyses of FIGS. 11-14 that, if OFC 100 is to be operated as a low-noise device, the lower-frequency sideband should be perpendicular to pump 2 (so the noise source is zero). In this case neither sideband has noise. These optimal configurations were illustrated in FIGS. 12 and 13.

Various modifications of the described embodiments, as well as other embodiments of the inventions (OPAs and OFCs), which are apparent to persons skilled in the art to which the inventions pertain, are deemed to lie within the principle and scope of the inventions as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

I claim:

1. A two-pump optical parametric device, OPD, adapted to generate a desired output signal, comprising:
   an optical medium that exhibits four-wave mixing;
   one or more polarization couplers that apply a first polarized pump $P_1$, a second polarized pump $P_2$, and a polarized input signal S to the optical medium, wherein a frequency of the pump $P_1$ is lower than a frequency of the pump $P_2$; and
   an optical filter that selects an idler I or an amplified signal S as the desired output signal, wherein:
      the idler I is coupled to the pumps $P_1$ and $P_2$ and the signal S via said four-wave mixing; and
      the one or more polarization couplers apply the pump $P_1$, the pump $P_2$, and the input signal S to the optical medium so that, in a set of four optical signals consisting of the pumps $P_1$ and $P_2$, the signal S, and the idler I, two of the optical signals have a first polarization and the remaining two of the optical signals have a second polarization orthogonal to the first polarization.

2. The two-pump OPD of claim 1, wherein:
   the polarization of the pump $P_1$ is perpendicular to the polarization of the pump $P_2$;
   the input signal S is configured as an inner sideband adjacent to a selected one of the pumps $P_1$ and $P_2$;
   the desired output signal is output from a respective inner sideband adjacent to the pump $P_1$ or the pump $P_2$, and
   the inner sideband adjacent to the pump $P_1$ is polarized parallel to the pump $P_1$;
   if the desired output is the amplified signal S, then the input signal S is configured as the inner sideband adjacent to the pump $P_1$ and the polarization of the input signal S is configured to be perpendicular to the polarization of the pump $P_2$ and
   if the desired signal is the idler I, then the input signal S is configured as the inner sideband adjacent to the pump $P_2$ and the polarization of the input signal S is configured to be parallel to the polarization of the pump $P_2$.

3. The two-pump OPD of claim 2, wherein the frequencies of the pumps $P_1$ and $P_2$ are selected to minimize outer-band idlers.

4. The two-pump OPD of claim 2, wherein the four-wave mixing is enabled by a phase-conjugating (PC) process.

5. The two-pump OPD of claim 1, wherein:
   the input signal S is configured as an inner sideband adjacent to the pump $P_1$ or an outer sideband adjacent to the pump $P_2$;
   if the input signal S is configured as the inner sideband adjacent to the pump $P_1$, then the OPD is configured to output the desired output signal from the outer sideband adjacent to the pump $P_2$; and
   if the input signal S is configured as the outer sideband adjacent to the pump $P_2$, then the OPD is configured to output the desired output signal from the inner sideband adjacent to the pump $P_1$.

6. The two-pump OPD of claim 5, wherein:
   the polarizations of the pumps $P_1$ and $P_2$ are parallel to each other; and
   the polarizations of the signal S and the idler I are both perpendicular to the polarizations of the pumps $P_1$ and $P_2$.

7. The two-pump OPD of claim 5, wherein:
   the polarizations of the pumps $P_1$ and $P_2$ are perpendicular to each other; and
   the polarization of the inner sideband is parallel to the polarization of the pump $P_1$.

8. The two-pump OPD of claim 5, wherein the frequencies of the pumps $P_1$ and $P_2$ are selected to minimize an outer sideband adjacent to the pump $P_1$ and an inner sideband adjacent to the pump $P_2$.

9. The two-pump OPD of claim 5, wherein the four-wave mixing is enabled by a Bragg scattering (BS) process.

10. The two-pump OPD of claim 1, wherein the one or more polarization couplers comprise:
   a first polarization coupler that applies the polarized input signal S to the optical medium;
   a second polarization coupler that applies the first polarized pump $P_1$ to the optical medium; and
   a third polarization coupler that applies the second polarized pump $P_2$ to the optical medium.

* * * * *

UNITED STATES PATENT AND TRADEMARK OFFICE
CERTIFICATE OF CORRECTION

PATENT NO. : 7,630,126 B2 Page 1 of 1
APPLICATION NO. : 11/172104
DATED : December 8, 2009
INVENTOR(S) : Colin J. McKinstrie It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1116 days.

Signed and Sealed this

Twenty-first Day of December, 2010

David J. Kappos
*Director of the United States Patent and Trademark Office*